United States Patent
Wang et al.

(10) Patent No.: US 11,126,312 B2
(45) Date of Patent: Sep. 21, 2021

(54) TOUCH SUBSTRATE, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qingpu Wang, Beijing (CN); Lei Zhang, Beijing (CN); Tsung Chieh Kuo, Beijing (CN); Wei Zhang, Beijing (CN); Bisheng Li, Beijing (CN); Baoran Li, Beijing (CN); Qin Zeng, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 507 days.

(21) Appl. No.: 15/779,699

(22) PCT Filed: Jul. 28, 2017

(86) PCT No.: PCT/CN2017/094848
§ 371 (c)(1),
(2) Date: May 29, 2018

(87) PCT Pub. No.: WO2018/028445
PCT Pub. Date: Feb. 15, 2018

(65) Prior Publication Data
US 2020/0310572 A1    Oct. 1, 2020

(30) Foreign Application Priority Data

Aug. 11, 2016  (CN) .......................... 201610654989.7

(51) Int. Cl.
G09G 1/00 (2006.01)
G06F 3/044 (2006.01)
G06F 3/041 (2006.01)

(52) U.S. Cl.
CPC .......... *G06F 3/0443* (2019.05); *G06F 3/0412* (2013.01); *G06F 3/0445* (2019.05); *G06F 3/0448* (2019.05)

(58) Field of Classification Search
None
See application file for complete search history.

(56) References Cited

U.S. PATENT DOCUMENTS

2014/0168536 A1\* 6/2014 Guo ........................ G06F 3/044
349/12

FOREIGN PATENT DOCUMENTS

CN   102637099 A    8/2012
CN   102855043    \*  1/2013 ............. G06F 3/044
(Continued)

OTHER PUBLICATIONS

PCT International Search Report, Application No. PCT/CN2017/094848, dated Nov. 7, 2017, 5 pages: with English translation.
(Continued)

*Primary Examiner* — Michael A Faragalla
(74) *Attorney, Agent, or Firm* — Armstrong Teasdale LLP

(57) ABSTRACT

The present disclosure relates to a touch substrate, a display panel, and a display device. The touch substrate includes a substrate and an electrode layer disposed on the substrate. The electrode layer includes at least two electrodes. Each electrode includes at least one sub-electrode. The sub-electrode includes an electrode unit array having at least two columns of electrode units, wherein any two columns in the electrode unit array do not intersect, each column in the electrode unit array includes at least two electrode units (Continued)

connected in series, and the any two adjacent columns in the electrode unit array are connected in parallel by a connection component.

20 Claims, 8 Drawing Sheets

(56) References Cited

FOREIGN PATENT DOCUMENTS

| CN | 102855043 A | 1/2013 |
|---|---|---|
| CN | 103164091 A | 6/2013 |
| CN | 103376959 A | 10/2013 |
| CN | 106293295 A | 1/2017 |

OTHER PUBLICATIONS

PCT Written Opinion, Application No. PCT/CN2017/094848, dated Nov. 7, 2017, 6 pages.: with English translation of relevant part.
China First Office Action, Application No. 201610654989.7, dated Apr. 25, 2017, 13 pps.: with English translation.

* cited by examiner

TOUCH SUBSTRATE, DISPLAY PANEL AND DISPLAY DEVICE

CROSS REFERENCE TO RELATED APPLICATIONS

This patent application is a National Stage Entry of PCT/CN2017/094848 filed on Jul. 28, 2017, which claims the benefit and priority of China Patent Application No. 201610654989.7 filed on Aug. 11, 2016, the disclosures of which are incorporated herein by reference in their entirety as part of the present application.

BACKGROUND

The present disclosure relates to a field of display technology, more particularly, to a touch substrate, a display panel, and a display device.

In electronic devices such as personal digital assistants (PDAs), laptops, office automation equipment, medical devices, and car navigation systems, touch screens have been widely used as an input means for these displays. There are different technical directions for the development of touch technology, for example, resistance direction, capacitive direction, and electromagnetic direction. The capacitive screen with low cost and excellent user experience has become the mainstream product.

The laminated structure of the bridge type touch screen is complex and can lead to the disadvantages of low transmittance of the touch screen and the like, thereby affecting the appearance and the performance of the touch screen. There is an increasing demand for narrow bezel and borderless technology in the current market. The single layer technology enables borderless or narrow bezel technology due to the indium tin oxide (ITO) edge routing. Therefore, single-layer technology has drawn people's attention.

However, the current single layer technology has the problems that the resistance of the electrode block is too large, equal impedance wiring is difficult to be arranged and the repeatability is poor, which leads to the difficulty of product design and the decrease of the final product performance.

BRIEF DESCRIPTION

Embodiments of the present disclosure provide a touch substrate, a display panel, and a display device.

A first aspect of the present disclosure provides a touch substrate, which includes a substrate, an electrode layer disposed on the substrate, the electrode layer including at least two electrodes, wherein each electrode includes at least one sub-electrode, the sub-electrode has an electrode unit array including at least two columns of electrode units, wherein any two columns in the electrode unit array do not intersect with each other and each column of the electrode unit array includes at least two electrode units connected in series, and any two adjacent columns in the electrode unit array are connected in parallel by a connection component.

In one embodiment, the electrode units of each column in the electrode cell array form a curved shape.

In one embodiment, the curved shape includes a curved shape formed by straight lines or a curved shape formed by a curved line.

In an embodiment, the at least two electrodes are arranged in a longitudinal direction, and adjacent ones of the at least two electrodes have complementary shapes.

In one embodiment, the sub-electrodes have a triangular or diamond shape, and adjacent ones of the at least two electrodes having complementary shapes form a rectangle.

In one embodiment, the sub-electrodes have at least one of the following shapes: a first shape being a triangular shape, a second shape being a shape consisting of a first triangle and a second triangle, wherein the first triangle and the second triangle have a first common vertex, and an angle bisector of first triangle passing through the first common vertex is centrosymmetric with an angle bisector of the second triangle passing through the first common vertex, a third shape being a diamond shape, a fourth shape being a shape composed of a third triangle and a fourth triangle, wherein the third triangle and the fourth triangle have a second common vertex, and a side of the third triangle passing through the second common vertex is on the same straight line as a side of the fourth triangle passing through the second common vertex, and the third and fourth triangle are located on the same side of the straight line.

In one embodiment, the at least two electrodes include a first electrode, a second electrode, and a third electrode that are sequentially disposed in the longitudinal direction and are spaced apart from one another, the first electrode includes at least one first sub-electrode, and the first sub-electrode has the first shape, the second electrode includes at least one second sub-electrode, and the second sub-electrode has the second shape, the third electrode includes at least one third sub-electrode, and the third sub-electrode has the first shape.

In an embodiment, the at least two electrodes further include at least one repeating unit disposed between the first electrode and the second electrode, the repeating unit including at least one first repeating unit portion and at least one second repeating unit portion, and wherein the first repeating unit portion has the second shape, and the second repeating unit portion has the third shape.

In an embodiment, the first electrode includes a plurality of the first sub-electrodes disposed in a lateral direction, the second electrode includes a plurality of the second sub-electrodes disposed in the lateral direction, the third electrode includes a plurality of the third sub-electrodes disposed in the lateral direction, the repeating unit includes a plurality of the first repeating unit portions disposed along the lateral direction and a plurality of the second repeating unit portions disposed along the lateral direction.

In one embodiment, the at least two electrodes include a first electrode and a fourth electrode which are sequentially disposed in the longitudinal direction and are spaced apart from each other, the first electrode includes at least one first sub-electrode, and the first sub-electrode has the first shape, the fourth electrode includes at least one fourth sub-electrode, and the fourth sub-electrode has the fourth shape.

In one embodiment, the at least two electrodes further include at least one repeating unit disposed between the first electrode and the fourth electrode, the repeating unit including at least one first repeating unit portion and at least one second repeating unit portion, and wherein the first repeating unit portion has the second shape, and the second repeating unit portion has the third shape.

In an embodiment, the first electrode includes a plurality of the first sub-electrodes disposed in the lateral direction, the fourth electrode includes a plurality of the fourth sub-electrodes disposed in the lateral direction, the repeating unit includes a plurality of the first repeating unit portions disposed in the lateral direction and a plurality of the second repeating unit portions disposed in the lateral direction.

In one embodiment, an area ratio of the first electrode, the first repeating unit portion, the second repeating unit portion, and the fourth electrode is about 57:61:57:19.

In one embodiment, an acute angles in the respective interior angles of the triangle and the diamond of the sub-electrode range from about 5° to 45°.

A second aspect of the present disclosure provides a display panel, wherein the display panel includes the touch substrate as described above.

A third aspect of the present disclosure provides a display device, wherein the display device includes the display panel as described above.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein.

DETAILED DESCRIPTION

Figure 1A:
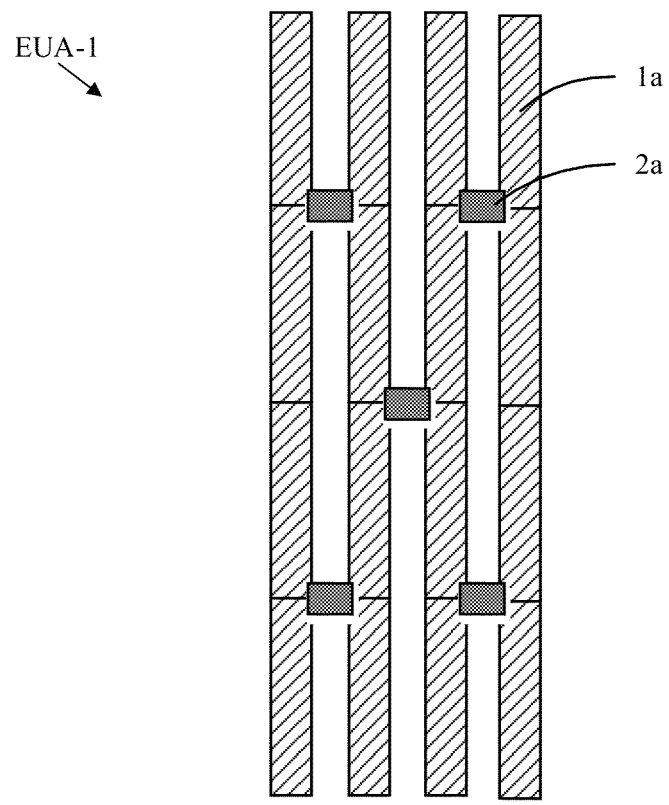
FIG. 1A is a schematic view of an electrode unit array of a touch substrate according to an embodiment of the present disclosure.

In order to make the technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively.

For purposes of the description hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

Figure 12:
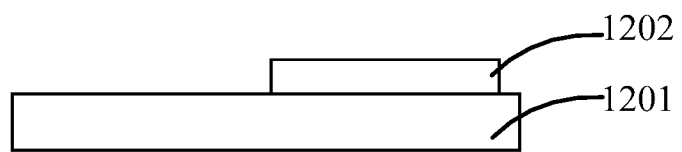
FIG. 12 is a schematic view showing a touch substrate according to an embodiment of the present disclosure.

An embodiment of the present disclosure provides a touch substrate, which includes a substrate 1201 (see FIG. 12) and an electrode layer 1202 (see FIG. 12) disposed on the substrate. The electrode layer includes at least two electrodes, and each electrode has an electrode unit array including at least two columns of electrode units. Any two columns in the electrode unit array do not intersect with each other, each column in the electrode unit array includes at least two electrode units connected in series, and any two adjacent columns in the electrode unit array are connected in parallel through the connection component.

Figure 1B:
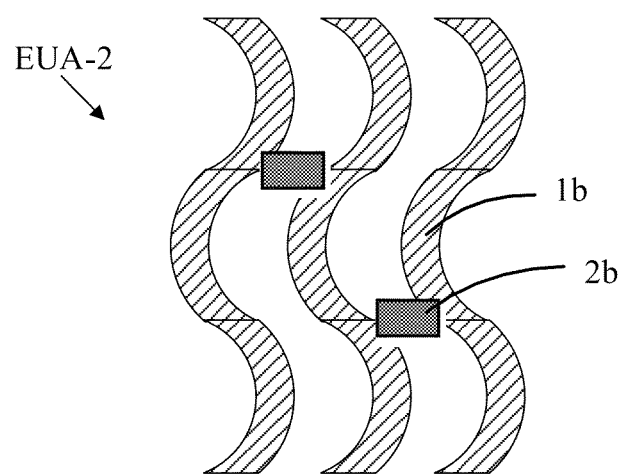
FIG. 1B is a schematic view of an electrode unit array of a touch substrate according to still another embodiment of the present disclosure.
Figure 1C:
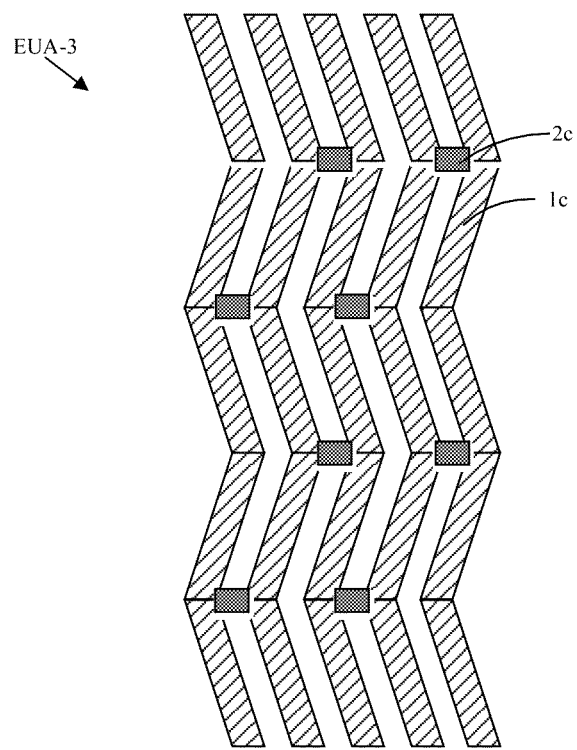
FIG. 1C is a schematic views of an electrode unit array of a touch substrate according to still another embodiment of the present disclosure.

FIGS. 1A-1C are schematic views of an electrode unit array of a touch substrate according to different embodiments of the present disclosure. It should be noted that the number of electrode units in the electrode unit array may be set according to actual needs and is not limited to the number shown in the figure. The number of columns of the electrode unit array may be set according to actual needs and is not limited to the number of columns shown in the figure.

FIG. 1A is a schematic view of an electrode unit array of a touch substrate according to an embodiment of the present disclosure. As shown in FIG. 1A, an electrode unit array EUA-1 includes a plurality of electrode units 1a. FIG. 1A illustrates an example in which the number of columns of the electrode unit array EUA-1 is 4 and each column of the electrode unit arrays EUA-1 includes four electrode units 1a connected in series as an example. In FIG. 1A, the electrode unit 1a has a straight line shape. It can be seen from FIG. 1A that any two adjacent columns in the electrode unit array EUA-1 are connected in parallel by a connection component 2a.

FIG. 1B is a schematic view of an electrode unit array of a touch substrate according to still another embodiment of the present disclosure. Other than electrode units in each column of the electrode unit array in FIG. 1A form a straight line shape, the electrode units in each column of the electrode unit array EUA-2 form a curved shape FIG. 1B. In FIG. 1B, the electrode unit 1b has a curved shape, and the curved shape of the electrode unit is a curved shape formed by a curved line. In FIG. 1B, the case where the number of columns of the electrode unit array EUA-2 is 3 and each column of the electrode cell array EUA-2 includes three electrode units 1b connected in series is taken as an example for description. It can be seen from FIG. 1B that any two adjacent columns in the electrode unit array EUA-2 are connected in parallel by a connection component 2b.

FIG. 1C is a schematic view of an electrode unit array of a touch substrate according to still another embodiment of the present disclosure. FIG. 1C illustrates an example in which the number of columns of the electrode unit array EUA-3 is 5 and each column of the electrode unit arrays EUA-3 includes 5 electrode units 1c connected in series as an example. In FIG. 1C, the electrode unit 1c has a curved shape, and the curved shape of the electrode unit is a curved shape formed by straight lines. It can be seen from FIG. 1C that any two adjacent columns in the electrode unit array EUA-3 are connected in parallel by a connection component 2c.

It should be noted that the electrode unit and the connection component may be formed simultaneously or may be formed of the same material. By changing the series and parallel positions and the number of the electrode units in the electrode unit array, it is possible to achieve electrodes with equal capacity and equal impedance.

When used for a liquid crystal display, arrangement directions of the columns of the electrode unit arrays shown in FIGS. 1B and 1C can be different from a pixel direction in the liquid crystal display (i.e., the direction of the longer edge of the R/G/B), so as to avoid interference.

In one embodiment, the electrodes of the electrode layer are longitudinally arranged and the adjacent electrodes have complementary shapes. The sub-electrodes of the touch substrate according to the embodiments of the present disclosure may have a triangular or diamond shape, and the electrodes of the electrode layer of the touch substrate are combined into a rectangle. The number of triangular-shaped sub-electrodes and diamond-shaped sub-electrodes is not limited, and the number of sub-electrodes may be adjusted according to actual needs. The number of electrodes is also not limited and can be adjusted according to the actual need. In one embodiment, the acute angles in the respective interior angle of the triangle and the diamond of the sub-electrodes range from about 5° to 45°. Detailed description will be made bellow with exemplary examples.

FIGS. 2A-2D are schematic views of different sub-electrode shapes of a touch substrate according to one embodiment of the present disclosure. As shown in FIGS. 2A-2D, the sub-electrode shape of the touch substrate may include at least one of the following shapes: a first shape S1, a second shape S2, a third shape S3, and a fourth shape S4. It should be noted that each sub-electrode shape in FIGS. 2A-2D is merely exemplary and is not for limiting purposes. The shapes of the sub-electrodes of the embodiments of the present disclosure may also include other shapes, not limited to the shapes shown in FIGS. 2A-2D. In one embodiment, the acute angle in the respective interior angles of the triangle and the diamond of each sub-electrode ranges from about 5° to 45°.

Figure 2A:
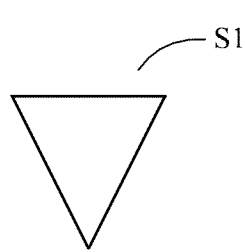
FIGS. 2A-2D is a schematic view of different sub-electrode shapes of a touch substrate according to an embodiment of the present disclosure.

As shown in FIG. 2A, the first shape S1 is a triangular shape. The triangle can be an isosceles triangle.

Figure 2B:
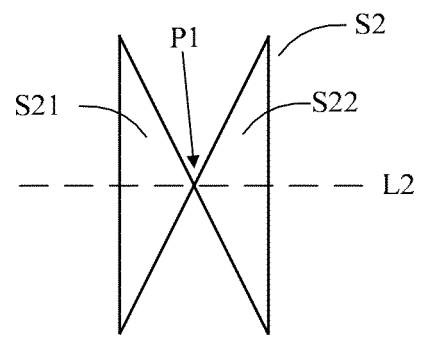

As shown in FIG. 2B, the second shape S2 is a shape composed of a first triangle S21 and a second triangle S22. Wherein the first triangle S21 and the second triangle S22 have a first common vertex P1 and an angle bisector of the first triangle S21 passing through the first common vertex P1 is centrosymmetric (in relation to the common vertex P1) with an angle bisector of the second triangle S22 passing through the first common vertex P1. In other words, the angle bisector of the first triangle S21 passing through the first common vertex P1 and the angle bisector of the second triangle S22 passing through the first common vertex P1 are located on the same straight line (a second straight line) L2. The first triangle S21 and the second triangle S22 may be isosceles triangles.

Figure 2C:
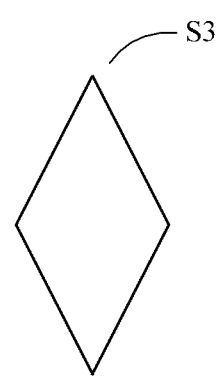
Figure 2D:
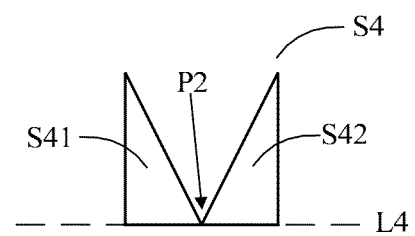

As shown in FIG. 2C, the third shape S3 is a diamond shape. As shown in FIG. 2D, the fourth shape S4 is a shape composed of the third triangle S41 and the fourth triangle S42. And wherein the third triangle S41 and the fourth triangle S42 have a second common vertex P2 and a side of the third triangle S41 passing through the second common vertex P2 and a side of the fourth triangle S42 passing through the second common vertex P2 lie on the same straight line (i.e., the fourth line) L4, and the third triangle S41 and the fourth triangle S42 are located on the same side of the straight line. The third triangle S41 and the fourth triangle S42 may be right-angled triangles.

In one embodiment, the electrode of the electrode layer includes a first electrode, a second electrode, and a third electrode which are sequentially disposed in the longitudinal direction and spaced apart from one another, and wherein the first electrode includes at least one first sub-electrode. The second electrode includes at least one second sub-electrode, and the third electrode includes at least one third sub-electrode.

Figure 3:
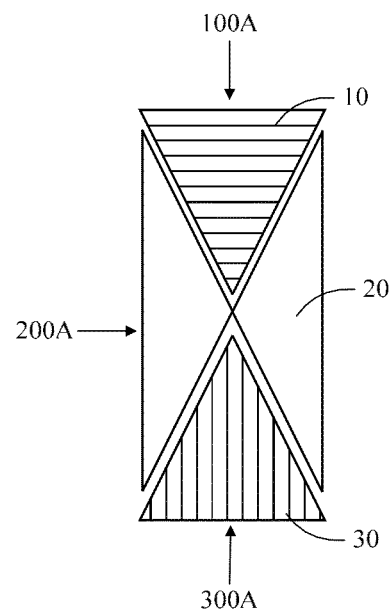
FIG. 3 is a schematic view showing an electrode layer according to an embodiment according to the present disclosure.

FIG. 3 is a schematic view illustrating an electrode layer according to one embodiment of the present disclosure. As shown in FIG. 3, the first electrode 100A includes a first sub-electrode 10, the second electrode 200A includes a second sub-electrode 20, and the third electrode 300A includes a third sub-electrode 30. The first sub-electrode 10 has a triangular first shape S1, the second sub-electrode 20 has a second shape S2 composed of two triangles, and the third sub-electrode has a triangular first shape S1. It can be seen from FIG. 3 that the adjacent electrodes among the first electrode, the second electrode, and the third electrode have complementary shapes, and the three electrodes have a rectangular shape.

Figure 4:
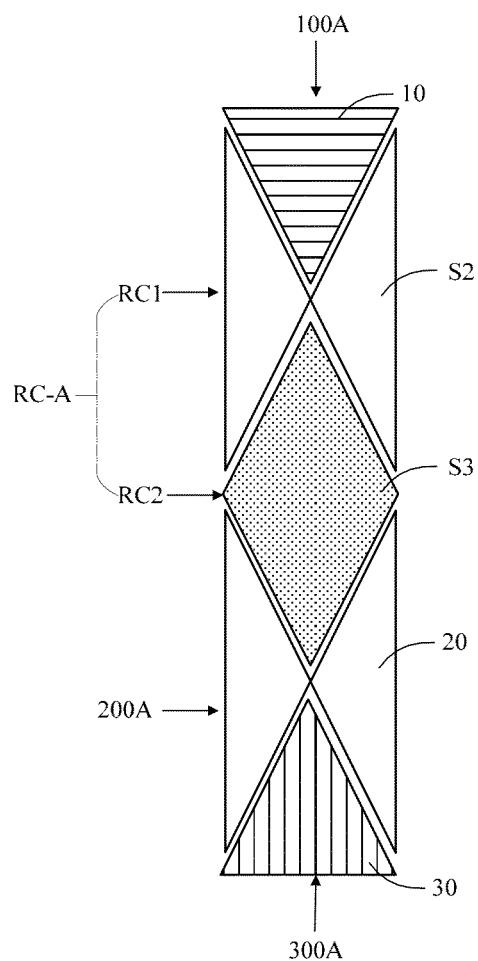
FIG. 4 is a schematic view showing an electrode layer according to a further embodiment of the present disclosure.

FIG. 4 is a schematic view showing an electrode layer according to still another embodiment of the present disclosure. As shown in FIG. 4, the electrode of the electrode layer further includes at least one repeating element RC-A disposed between the first electrode 100A and the second electrode 200A, the repeating element including at least one first repeating unit portion RC1 and at least one second repeating element portion RC2, and wherein the first repeating element portion has a second shape S2 and the second repeating element portion has a third shape S3.

Figure 5:
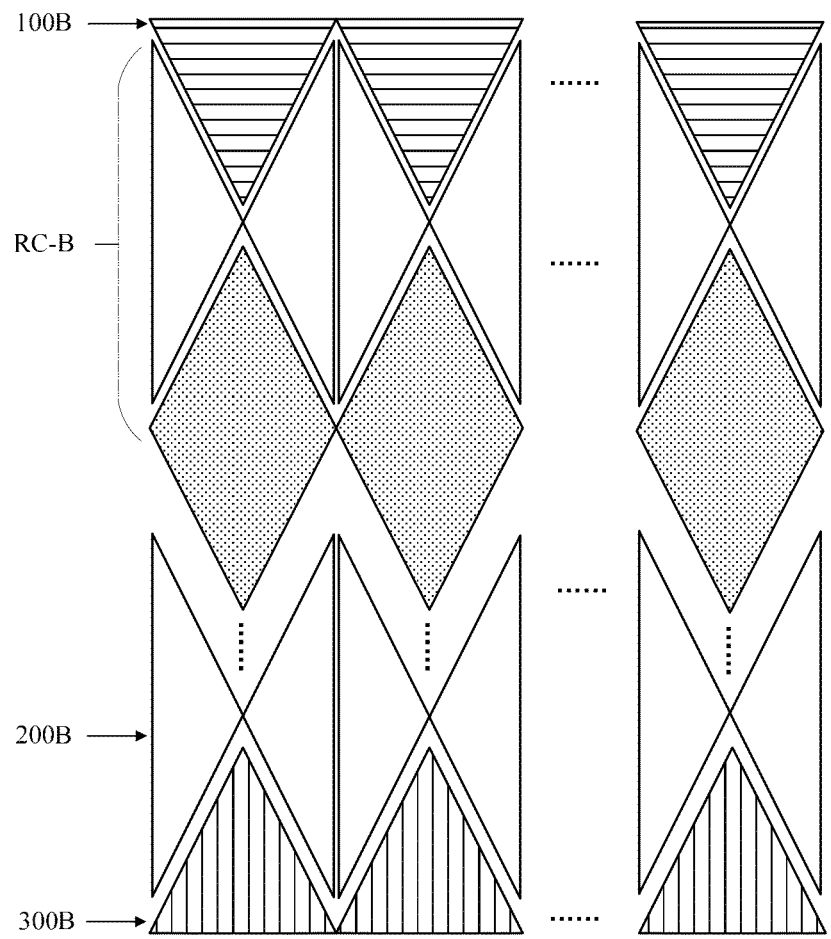
FIG. 5 is a schematic view showing an electrode layer according to still another embodiment of the present disclosure.

FIG. 5 is a schematic view showing an electrode layer according to still another embodiment of the present disclosure. As shown in FIG. 5, the first electrode 100B includes a plurality of first sub-electrodes disposed in a lateral direction, the second electrode 200B includes a plurality of second sub-electrodes disposed in the lateral direction, the third electrode 300B includes a plurality of third sub-electrodes disposed in the lateral direction, the repeating unit RC-B includes a plurality of first repeating unit portions disposed in the lateral direction and a plurality of second repeating unit portions disposed in the lateral direction.

In one embodiment, the electrodes of the electrode layer include a first electrode and a fourth electrode that are sequentially disposed in the longitudinal direction and are spaced apart from each other, and wherein the first electrode includes at least one first sub-electrode.

Figure 6:
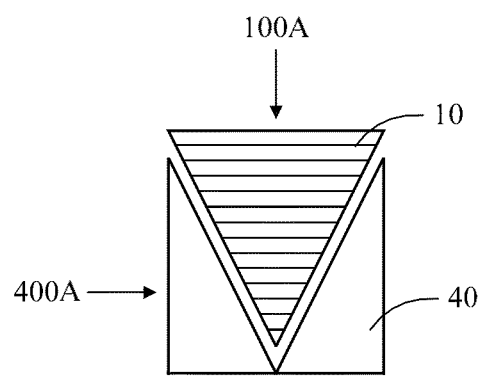
FIG. 6 is a schematic view showing an electrode layer according to another embodiment of the present disclosure.

FIG. 6 is a schematic view illustrating an electrode layer according to another embodiment of the present disclosure. As shown in FIG. 6, the electrodes of the electrode layer includes a first electrode 100A and a fourth electrode 400A which are sequentially disposed in the longitudinal direction and are spaced apart from each other, wherein the first electrode includes the first sub-electrode 10 and the fourth electrode includes the fourth sub-electrode 40. The first sub-electrode has a first shape S1, and the fourth sub-electrode has a fourth shape S4. It can be seen from FIG. 6 that the adjacent first electrodes and the fourth electrodes have complementary shapes, and the first electrodes and the fourth electrodes form a rectangular shape.

Figure 7:
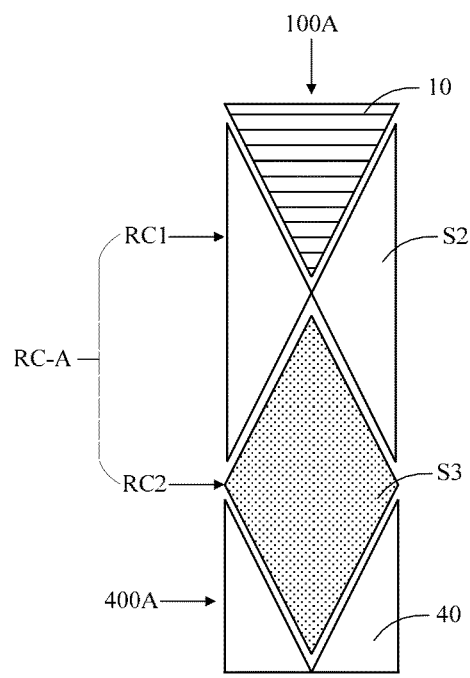
FIG. 7 is a schematic view showing an electrode layer according to still another embodiment of the present disclosure.

FIG. 7 is a schematic view showing an electrode layer according to still another embodiment of the present disclosure. As shown in FIG. 7, the electrode of the electrode layer further includes at least one repeating unit RC-A disposed between the first electrode 100A and the fourth electrode 400A, the repeating unit including at least one first repeating unit portion RC1 and at least one second repeating portion RC2, and wherein the first repeating element portion has a second shape S2 and the second repeating element portion has a third shape S3.

In one embodiment, for the structure shown in FIG. 7, an area ratio of the first electrode 100A, the first repeating unit portion RC1, the second repeating unit portion RC2, and the fourth electrode 400A may be about 57:61:57:19.

Figure 8:
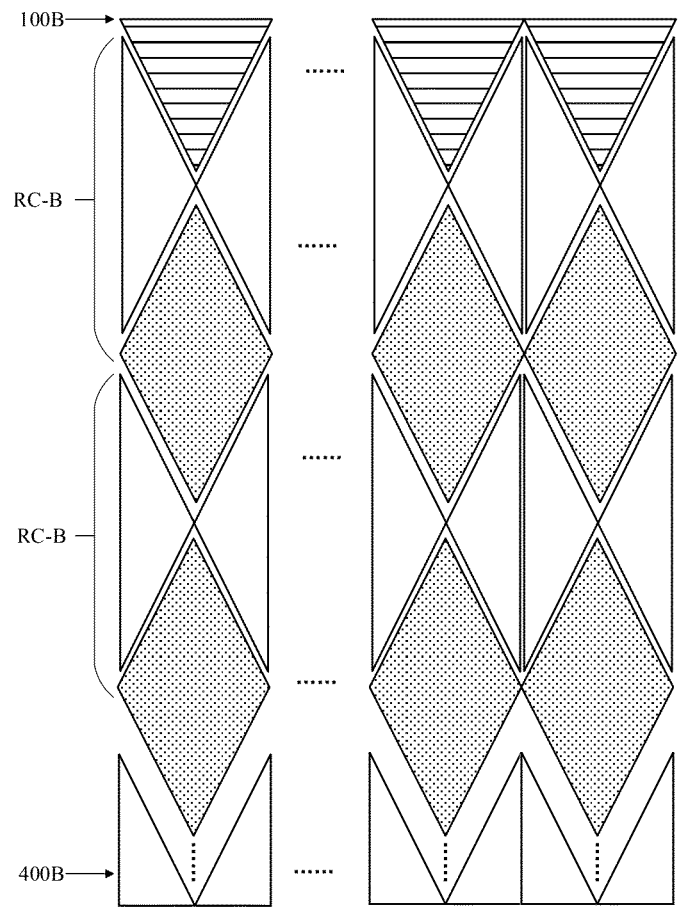
FIG. 8 is a schematic view showing an electrode layer according to still another embodiment of the present disclosure.

FIG. 8 is a schematic view showing an electrode layer according to still another embodiment of the present disclosure. As shown in FIG. 8, the first electrode 100B includes a plurality of first sub-electrodes disposed along a lateral direction, the fourth electrode 400B includes a plurality of fourth sub-electrodes disposed along the lateral direction, the repeating unit RC-B includes a plurality of a first repeating unit portions disposed in the lateral direction and a plurality of second repeating unit portions disposed in a lateral direction.

Figure 9:
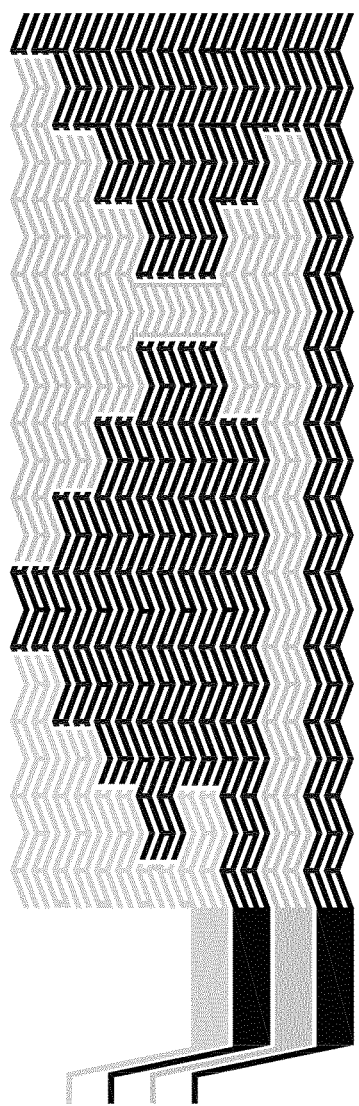
FIG. 9 is a schematic view showing an electrode layer according to another embodiment of the present disclosure.

FIG. 9 is a schematic view of an electrode layer according to another embodiment of the present disclosure. As shown in FIG. 9, in actual operation, an edge of a sub-electrode (e.g., a triangular shape or a diamond shape) may have a stepped shape. Also, the shape of the sub-electrode is not strictly in accordance with the case shown in FIG. 2, which may be generally triangular or diamond-shaped.

Embodiments of the present disclosure also provide a display panel, which includes the touch substrate as described above.

Figure 10:
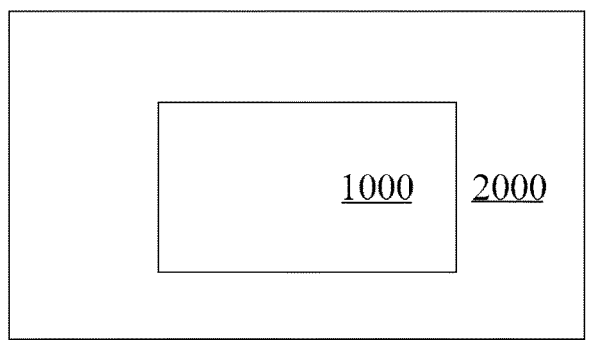
FIG. 10 is a schematic view showing a display panel according to an embodiment of the present disclosure.

FIG. 10 shows a schematic view of a display panel according to one embodiment of the present disclosure. As shown in FIG. 10, the display panel 2000 may include the touch substrate 1000 described above.

Embodiments of the present disclosure also provide a display device including the display panel as described above.

Figure 11:
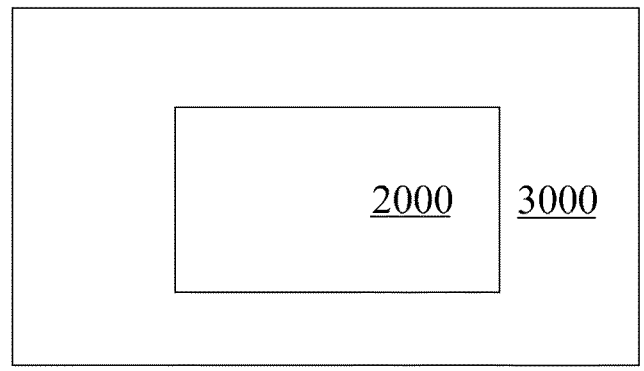
FIG. 11 is a schematic view showing a display device according to an embodiment of the present disclosure.

FIG. 11 shows a schematic view of a display device according to one embodiment of the present disclosure. As shown in FIG. 11, the display device 3000 may include the display panel 2000 as described above.

The display device may be a display device having a display function such as a display panel, a display, a television, a tablet, a cell phone, a navigator, and the like, which is not limited in the present disclosure.

The technical solution provided by the embodiments of the present disclosure can solve the problem that the impedance of the electrode in the prior art is too large, equal impedance wiring difficult, and the repeatability is poor. By configuring the electrode layer on the substrate to include at least two electrodes, wherein each electrode includes at least one sub-electrode having an electrode unit array including at least two columns of electrode units, each column of the electrode unit array includes at least two electrode units connected in series, and any two adjacent columns in the electrode unit array are connected in parallel through a connection component, a design of equal impedances and equal capacitances between different electrodes can be realized, the touch experience of products can be improved, the difficulty and complexity of design and wiring can be reduced, and the frameless or narrow bezel technology in the touch area can be realized.

Having described certain specific embodiments, these embodiments have been presented by way of example only, and are not intended to limit the scope of the present disclosure. Indeed, the novel embodiments described herein may be embodied in various other forms, furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A touch substrate comprising:
   a substrate; and
   an electrode layer on the substrate, wherein the electrode layer comprises at least two electrodes, and wherein each of the electrodes comprises at least one sub-electrode having an electrode unit array, the electrode unit array comprising at least two columns of electrode units, wherein any two columns in the electrode unit array do not intersect with each other, each column in the electrode unit array comprises at least two electrode units connected in series, and any two adjacent columns in the electrode unit array are connected in parallel through a connection component,
   wherein the at least two electrodes comprise:
      a first electrode, a second electrode, and a third electrode that are sequentially disposed in a longitudinal direction and are spaced apart from one another, wherein the first electrode comprises at least one first sub-electrode having a first shape, the second electrode comprises at least one second sub-electrode having a second shape, and the third electrode comprises at least one third sub-electrode having the first shape, and
      at least one repeating electrode unit disposed between the first electrode and the second electrode, wherein the repeating electrode unit comprises at least one first repeating electrode unit portion and at least one second repeating electrode unit portion, wherein the first repeating electrode unit portion has the second shape, and wherein the second repeating electrode unit portion has a third shape.

2. The touch substrate according to claim 1, wherein the electrode units of each column in the electrode unit array form a curved shape.

3. The touch substrate according to claim 2, wherein the curved shape comprises one of a curved shape formed by straight lines and a curved shape formed by a curved line.

4. The touch substrate according to claim 1, wherein adjacent ones of the at least two electrodes have complementary shapes.

5. The touch substrate of claim 4, wherein the sub-electrode has one of a triangular and diamond shape.

6. The touch substrate according to claim 5, wherein the sub-electrode has at least one of the following shapes:
   a first shape being a triangular shape;

a second shape being a shape consisting of a first triangle and a second triangle, wherein the first triangle and the second triangle have a first common vertex, and wherein an angle bisector of the first triangle passing through the first common vertex is centrosymmetric with an angle bisector of the second triangle passing through the first common vertex; and a third shape being a diamond shape.

7. The touch substrate according to claim 1, wherein, the first electrode comprises a plurality of the first sub-electrodes disposed in a lateral direction;

the second electrode comprises a plurality of the second sub-electrodes disposed in a lateral direction;

the third electrode comprises a plurality of the third sub-electrodes disposed in the lateral direction; and the repeating electrode unit comprises a plurality of the first repeating electrode unit portions disposed in the lateral direction and a plurality of the second repeating electrode unit portions disposed in the lateral direction.

8. A touch substrate comprising:

a substrate; and an electrode layer on the substrate, wherein the electrode layer comprises at least two electrodes, and wherein each of the electrodes comprises at least one sub-electrode having an electrode unit array, the electrode unit array comprising at least two columns of electrode units, wherein any two columns in the electrode unit array do not intersect with each other, each column in the electrode unit array comprises at least two electrode units connected in series, and any two adjacent columns in the electrode unit array are connected in parallel through a connection component, wherein the at least two electrodes comprise:

a first electrode and a fourth electrode that are sequentially disposed in the longitudinal direction and are spaced apart from each other, wherein the first electrode comprises at least one first sub-electrode having a first shape, and wherein the fourth electrode comprises at least one fourth sub-electrode having a fourth shape, and at least one repeating electrode unit disposed between the first electrode and the fourth electrode, wherein the repeating electrode unit comprises at least one first repeating electrode unit portion and at least one second repeating electrode unit portion, wherein the first repeating electrode unit portion has a second shape, and wherein the second repeating electrode unit portion has a third shape.

9. The touch substrate according to claim 8, wherein, the first electrode comprises a plurality of the first sub-electrodes disposed in the lateral direction;

the fourth electrode comprises a plurality of the fourth sub-electrodes disposed in the lateral direction; and the repeating electrode unit comprises a plurality of the first repeating electrode unit portions disposed in the lateral direction and a plurality of the second repeating electrode unit portions disposed in the lateral direction.

10. The touch substrate according to claim 8, wherein an area ratio of the first electrode, the first repeating electrode unit portion, the second repeating electrode unit portion, and the fourth electrode is about 57:61:57:19.

11. The touch substrate according to claim 5, wherein an acute angle in each of the interior angles of the triangle and the diamond of the sub-electrode ranges from about 5° to 45°.

12. A display panel, wherein the display panel comprises the touch substrate according to claim 1.

13. A display device, wherein the display device comprises the display panel according to claim 12.

14. The touch substrate according to claim 8, wherein the electrode units of each column in the electrode unit array form a curved shape.

15. The touch substrate according to claim 14, wherein the curved shape comprises one of a curved shape formed by straight lines and a curved shape formed by a curved line.

16. The touch substrate according to claim 8, wherein the at least two electrodes are arranged in a longitudinal direction, and wherein adjacent ones of the at least two electrodes have complementary shapes.

17. The touch substrate of claim 16, wherein the sub-electrode has one of a triangular and diamond shape.

18. The touch substrate according to claim 17, wherein the sub-electrode has at least one of the following shapes:

a first shape being a triangular shape;

a second shape being a shape consisting of a first triangle and a second triangle, wherein the first triangle and the second triangle have a first common vertex, and wherein an angle bisector of the first triangle passing through the first common vertex is centrosymmetric with an angle bisector of the second triangle passing through the first common vertex;

a third shape being a diamond shape; and a fourth shape being a shape composed of a third triangle and a fourth triangle, wherein the third triangle and the fourth triangle have a second common vertex, and wherein a side of the third triangle passing through the second common vertex is on the same straight line as a side of the fourth triangle passing through the second common vertex, and wherein the third triangle and the fourth triangle are located on the same side of the straight line.

19. A display panel, wherein the display panel comprises the touch substrate according to claim 8.

20. A display device, wherein the display device comprises the display panel according to claim 19.

* * * * *